United States Patent
Giefers et al.

(10) Patent No.: US 11,275,713 B2
(45) Date of Patent: Mar. 15, 2022

(54) BIT-SERIAL LINEAR ALGEBRA PROCESSOR

(71) Applicant: INTERNATIONAL BUSINESS MACHINES CORPORATION, Armonk, NY (US)

(72) Inventors: Heiner Giefers, Langnau am Albis (CH); Raphael Polig, Langnau am Albis (CH); Jan Van Lunteren, Rüschlikon (CH)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/004,358

(22) Filed: Jun. 9, 2018

(65) Prior Publication Data

US 2019/0377707 A1     Dec. 12, 2019

(51) Int. Cl.
| | | |
|---|---|---|
| *G06F 15/80* | (2006.01) | |
| *G06F 7/544* | (2006.01) | |
| *G06F 17/16* | (2006.01) | |
| *G06F 7/504* | (2006.01) | |
| *G06F 7/527* | (2006.01) | |

(52) U.S. Cl.
CPC .......... *G06F 15/8046* (2013.01); *G06F 7/504* (2013.01); *G06F 7/527* (2013.01); *G06F 7/5443* (2013.01); *G06F 17/16* (2013.01)

(58) Field of Classification Search
CPC ........ G06F 15/8046; G06F 7/52; G06F 7/525; G06F 7/5443; G06F 17/16; G06N 3/04; G06N 3/06; G06N 3/063
See application file for complete search history.

(56) References Cited

U.S. PATENT DOCUMENTS

| | | | |
|---|---|---|---|
| 7,930,690 B1 | 4/2011 | Stanculescu | |
| 9,104,474 B2 | 8/2015 | Kaul | |
| 2006/0242213 A1 | 10/2006 | Wood | |
| 2012/0089655 A1 | 4/2012 | Erinjippurath | |
| 2014/0108481 A1 | 4/2014 | Davis | |
| 2017/0357891 A1* | 12/2017 | Judd | G06N 3/049 |
| 2018/0046903 A1* | 2/2018 | Yao | G06N 3/0481 |
| 2018/0322390 A1* | 11/2018 | Das | G06N 3/084 |
| 2020/0050918 A1* | 2/2020 | Chen | G06N 3/04 |

OTHER PUBLICATIONS

Hennessy et al., Computer Architecture: A quantitative approach, Elsevier Science and Technology, (2014), p. 480. (Year: 2014).*
T. Chen et al., DianNao: A Small-Footprint High-Throughput Accelerator for Ubiquitous Machine-Learning, ASPLOS '14, 2014 (Year: 2014).*

(Continued)

*Primary Examiner* — Emily E Larocque
(74) *Attorney, Agent, or Firm* — Daniel Morris; Otterstedt, Wallace & Kammer, LLP (57) ABSTRACT

The invention is notably directed to a computing system configured to perform linear algebraic operations. The computing system comprises a co-processing module comprising a co-processing unit. The co-processing unit comprises a parallel array of bit-serial processing units. The bit-serial processing units are adapted to perform the linear algebraic operations with variable precision. The invention further concerns a related computer implemented method and a related computer program product.

5 Claims, 8 Drawing Sheets

(56) References Cited

OTHER PUBLICATIONS

Y. Chen, et al., DaDianNao: A Machine-Learning Supercomputer, 47th Annual IEEE/ACM International Symposium on Microarchitecture, IEEE Computer Society, 2014 (Year: 2014).*

Alberto Delmas et al., "Dynamic Stripes: Exploiting the Dynamic Precision Requirements of Activation Values in Neural Networks", Jun. 1, 2017, URL: https://arxiv.org/pdf/1706.00504.pdf, pp. 1-3.

VPC: Variable Precision Computing, Jul. 21, 2017, URL: https://computation.llnl.gov/projects/vpc-variable-precision-computing, pp. 1-3.

K. Neelima et al., "An Algorithm for FPGA Based Implementation of Variable Precision MAC Unit for High Performance Digital FIR Filters", International Journal of Engineering Research and Applications (IJERA), vol. 2, Issue 6, Nov.-Dec. 2012, p. 670-673.

Henk J. Sips, "Comments on 'An 0(n) Parallel Multiplier with Bit-Sequential Input and Output'", IEEE Transactions on Computers C-31:4, 1982, pp. 7-20.

Sips, Henk J. "Comments on "An O (n) Parallel Multiplier with Bit-Sequential Input and Output"." IEEE Transactions on Computers 100.4 (1982): 325-327.

* cited by examiner

BIT-SERIAL LINEAR ALGEBRA PROCESSOR

BACKGROUND

The disclosure relates to a computing system for performing linear algebraic operations. The disclosure further relates to a method for performing linear algebraic operations and a computer program product for performing linear algebraic operations.

Linear algebraic operations are a fundamental computational primitive and include in particular matrix-matrix multiplications. The latter primitive is of particular interest as it forms the basis of several linear algebraic operations and it is one of the most commonly used mathematical operations in science and engineering. A matrix is usually represented by a two-dimensional array of matrix elements and a vector by a one-dimensional array of vector elements. A matrix may be considered as array of vectors.

Accordingly there is a need for computing systems that support linear algebraic operations.

SUMMARY

According to a first aspect, the invention is embodied as a computing system configured to perform linear algebraic operations. The computing system comprises a co-processing module comprising a co-processing unit. The co-processing unit comprises a parallel array of bit-serial processing units. The bit-serial processing units are adapted to perform the linear algebraic operations with variable precision.

According to an embodiment of another aspect of the invention a computer implemented method is provided for performing linear algebraic operations by a computing system. The computing system comprising a co-processing module comprising a co-processing unit. The co-processing unit comprises a parallel array of bit-serial processing units. The method comprises steps of performing, by the bit-serial processing units, linear algebraic operations with variable precision.

Another aspect of the invention relates to a computer program product for operating a computing system according to the first aspect.

The computer program product comprises a computer readable storage medium having program instructions embodied therewith, the program instructions executable by the computing system to cause the computing system to perform a method comprising steps of performing, by the bit-serial processing units, linear algebraic operations with variable precision.

Embodiments of the invention will be described in more detail below, by way of illustrative and non-limiting examples, with reference to the accompanying drawings.

DETAILED DESCRIPTION

In reference to FIGS. 1-9, some general aspects and terms of embodiments of the invention are described.

In the context of this description, the following conventions, terms and/or expressions may be used.

A deep neural network (DNN) is understood as an artificial neural network (ANN) with multiple hidden layers between the input and output layers. DNNs can model complex relationships. DNNs are typically feedforward networks in which data flows from the input layer to the output layer without looping back.

DNNs are known to work well with integer data, at least in the forward pass. Furthermore, DNNs may have only marginal quality degradation when a reduced or much reduced data type is used for the weights, e.g. data types between 1 and 8 bits.

Variable precision computing may be defined according to embodiments as a computing approach that uses the lowest precision needed for a desired accuracy result. Embodiment of the invention provide variable precision computing systems and corresponding methods that may improve runtime, may reduce power consumption and may reduce data movements.

In parallel computer architectures, a systolic array may be defined as a homogeneous network of tightly coupled processing units. Such processing units of a systolic array may be also referred to as data processing units (DPUs), cells or nodes. Each node or DPU independently computes a partial result as a function of the data received from its upstream neighbors, stores the result within itself and passes it downstream.

According to embodiments of the invention, bit-serial operations are used to perform linear algebraic operations with variable precision. This provides as advantages a high performance as a result of the associated high-speed logic due to short wires and flexibility in terms of data type support as the serial arithmetic can support variable precision data. Further aspects of the invention addresses an efficient memory layout to facilitate bit-wise data processing.

Figure 1:
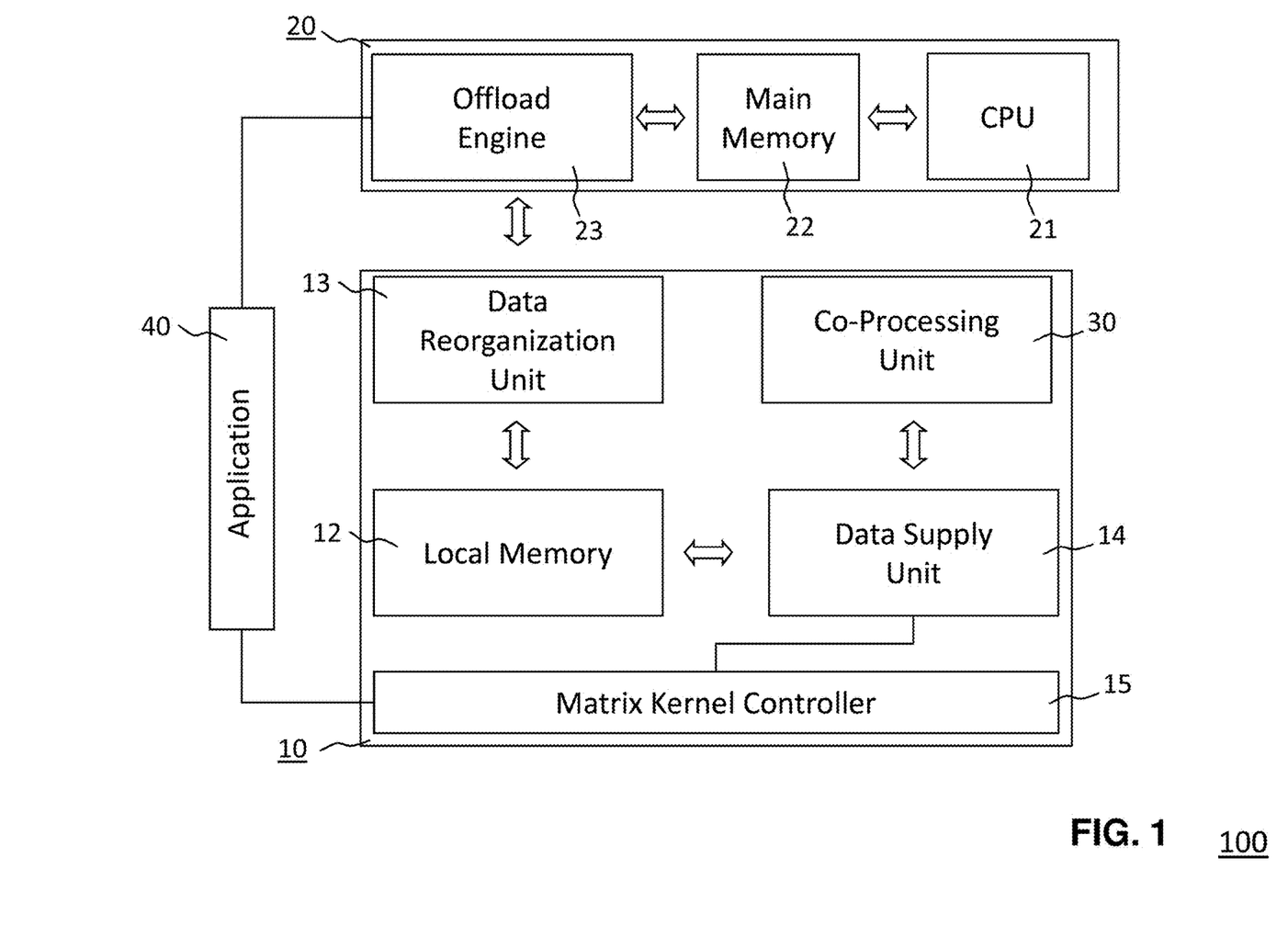
FIG. 1 shows a block diagram of a computing system according to an embodiment of the invention.

FIG. 1 shows a block diagram of a computing system 100 according to an embodiment of the invention. The computing system 100 is configured to perform linear algebraic operations and comprises a host unit 20 and a co-processing module 10.

The host unit 20 comprises a central processing unit (CPU) 21, a main memory 22 and an offload engine 23.

The co-processing module 10 comprises a local memory 12, a data reorganization unit 13, a data supply unit 14, a kernel controller 15 and a co-processing unit 30.

The computing system 100 may run applications 40, in particular applications that involve linear algebraic computations. Such linear algebraic computations or operations include in particular matrix-matrix multiplications.

The computing system 100 is in particular configured to offload the processing of the linear algebraic operations from the host unit 20 to the co-processing module 10. Accordingly, the co-processing module 10 is in particular adapted to perform linear algebraic operations, in particular matrix-matrix multiplications.

The offload engine 23 configures the data reorganization unit 13 for a subsequent data transfer between the main memory 22 and the local memory 12. This includes a configuration of the data format and the data size to be transferred. The data to be transferred is data that shall be subsequently processed by the co-processing module 10, e.g. matrix and vector data of matrix-matrix or matrix-vector multiplications. Furthermore, the offload engine 23 initiates a Direct Memory Access (DMA) transfer of the data to be processed from the main memory 22 to the local memory 12.

The data reorganization unit 13 receives the data to be processed as input data in a byte-wise format from the offload engine 23. Then it transforms the input data on the fly into a bit-serial format and stores the input data to be processed in the bit-serial format in the local memory 12.

The co-processing unit 30 may be configured by software to perform the linear algebraic operations with variable precision. For this, the data supply unit 14 configures the co-processing unit 30 for a desired and selected bit width. The bit width may be e.g. set by the application 40 that runs on the computing system 100. Furthermore, the data supply unit 14 controls data write operations for the writing of data from the local memory 12 to the co-processing unit 30 and the data supply unit 14 controls data read operations for the reading of data, in particular result data, from the co-processing unit 30 to the local memory 12. In addition, the data supply unit 14 may manage the data setup for the co-processing unit 30 of the data that shall be processed. Furthermore, the data supply unit 14 may control a block-wise operation of the linear algebraic operations, in particular a block-wise matrix operation, for the kernel controller 15.

The computing system 100 may be in particular a deep neural network (DNN).

Figure 2:
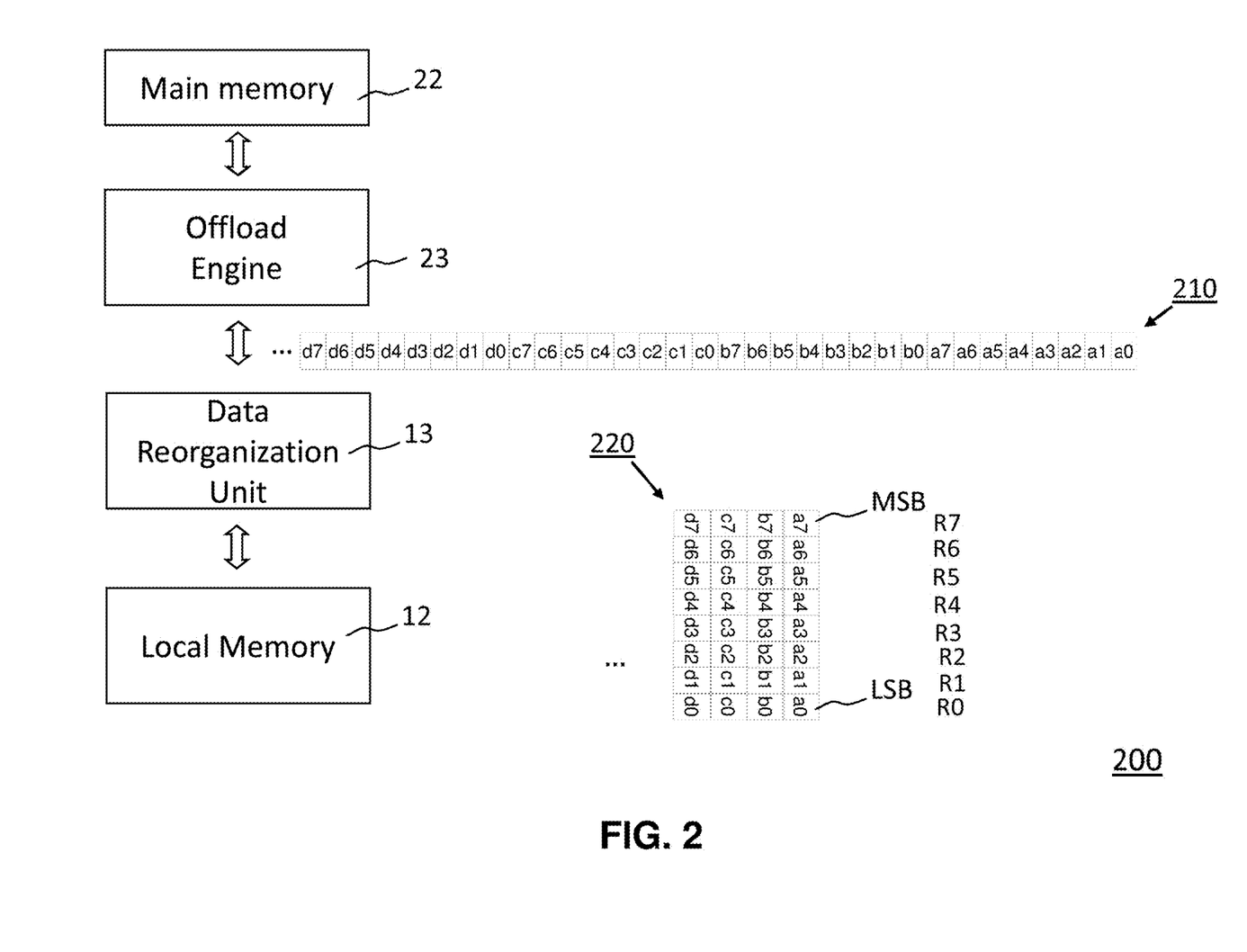
FIG. 2 shows a block diagram of a part of a computing system according to an embodiment of the invention illustrating the functioning of a data reorganization unit.

FIG. 2 illustrates in more detail the functioning of the data reorganization unit 13 and the memory layout of the local memory 12 of the co-processing module.

The main memory 22 is configured to store the data byte-wise and has hence a byte-level memory layout. This means that the smallest entity that can be addressed and read out is a byte of information. In other words, a byte is the smallest piece of information that is natively supported by the central processing unit 21 and the memory hierarchy of the main memory 22. According to embodiments, the main memory 22 may be a DRAM memory and a read operation may involve the reading of a plurality of bytes stored in a plurality of banks under a respective row address.

Hence the data reorganization unit 13 receives the data to be processed in a byte-wise format 210 as input data from the offload engine 23. In this example, four bytes d7-d0, c7-c0, b7-b0 and a7-a0 are shown.

The data reorganization unit 13 then transforms the input data into a bit-serial format 220 and stores the input data in this bit-serial format 220 in the local memory 12. Accordingly, the local memory 12 has a bit-level memory layout. More particularly, the i-th bits of each byte are arranged in a common row, wherein i is the index of the respective bits.

As an example, the bits d0, c0, b0 and a0 are arranged in the row R0, the bits d1, c1, b1 and a1 are arranged in the row R1, the bits d2, c2, b2 and a2 are arranged in the row R2 and so on until the bits d7, c7, b7 and a7 which are arranged in the row R7. In this embodiment it is assumed that the bits d0, c0, b0 and a0 in the row R0 are the least significant bits LSB and the bits d7, c7, b7 and a7 in the row R7 are the most significant bits MSB. According to other embodiments, this might be vice versa, namely that the bits d0, c0, b0 and a0 in the row R0 are the most significant bits and the bits d7, c7, b7 and a7 in the row R7 are the least significant bits.

The data that is stored in the local memory 12 and processed by the co-processing module 10 is assumed to have a fixed point data representation or in other words a fixed point data format. According to preferred embodiments, the data stored by the local memory 12 and processed by the co-processing module 10 has a two's complement integer representation or in other words a two's complement integer format.

Hence according to this example, the data is stored with 8 bits. These 8 bits represent the highest accuracy of the processing of the co-processing module 10. A lower d-bit representation of that data can be accessed by skipping the (8-d) lower significant rows and the corresponding lower significant bits. Or in general terms, if the data is stored with d bits, the k-bit representation of that data can be accessed by skipping the (d-k) lower significant rows and the corresponding bits.

Accordingly, only the higher significant bits including the most significant bit are used for the subsequent computation, while the lower significant bits are skipped and not used. Hence the subsequent computation is performed with reduced precision.

As a further example, if the data is stored with 8 bits representing a value integer range from 0-255, and only the two highest bits are used for the computation, while the 6 lower significant bits are skipped, only the higher value range from 64 to 255 is encoded, while the values lower than 64 are set to 0.

Due to the bit-level memory layout, it is possible to transfer only the bits of the rows that are needed for the current desired precision to the co-processing unit.

As an example, if e.g. a 3-bit precision is desired for a computation, only the respective 3 bits of the rows R7, R6 and R5 need to be transferred from the local memory 12 to the co-processing unit 30. This is a highly efficient approach which increases speed and reduces latency.

Figure 3:
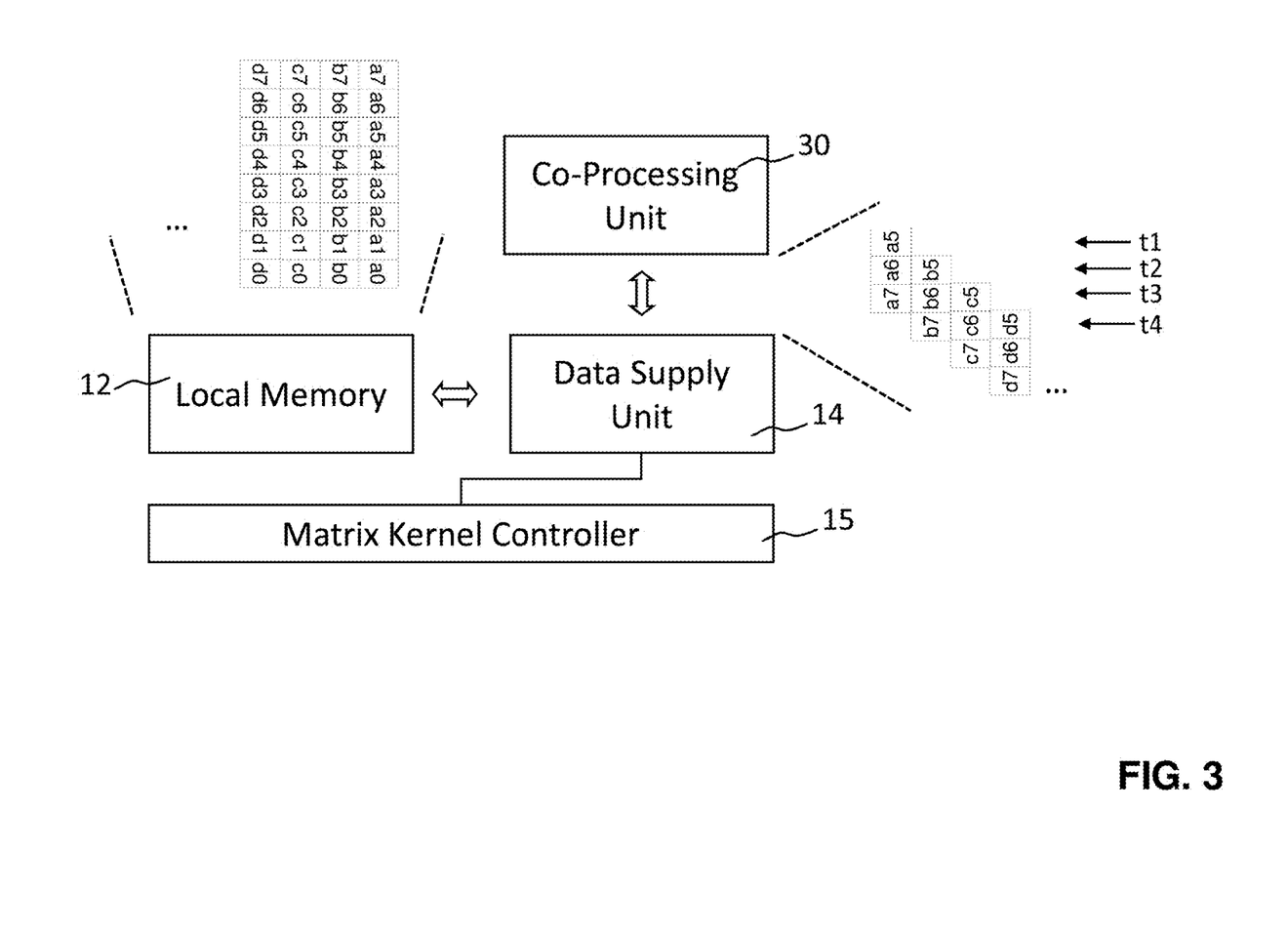
FIG. 3 shows a block diagram of a part of a computing system according to an embodiment of the invention illustrating the functioning of a data supply unit.

FIG. 3 illustrates in more detail the functioning of the data supply unit 14 in cooperation with the local memory 12 and the co-processing unit 30.

In this example it is assumed that the linear algebraic operation is a matrix-vector multiplication and shall be performed with an accuracy/precision of 3 bits. Furthermore, it is assumed that the co-processing unit 30 is embodied as 2-dimensional systolic array.

According to the selected precision of 3-bits, only the respective three highest bits a7, b7, c7, d7 . . . ;
a6, b6, c6, d6 . . . ; and
a5, b5, c5, d5 . . . ;

in the rows R7, R6 and R5 respectively are used for the subsequent linear algebraic operation and are read out of the local memory 12 by the data supply unit 14.

The data supply unit 14 is configured to supply the bits as follows to the co-processing unit 30. At time t1, the bit a5 is supplied to the co-processing unit 30. At time t2, the bits a6 and b5 are supplied to the co-processing unit 30. At time t3, the bits a7, b6 and c5 are supplied to the co-processing unit 30. At time t4, the bits b7, c6 and d5 are supplied to the co-processing unit 30. Such a staggered supply of the bits supports the corresponding operation of the 2-dimensional systolic array of the co-processing unit 30.

Figure 4A:
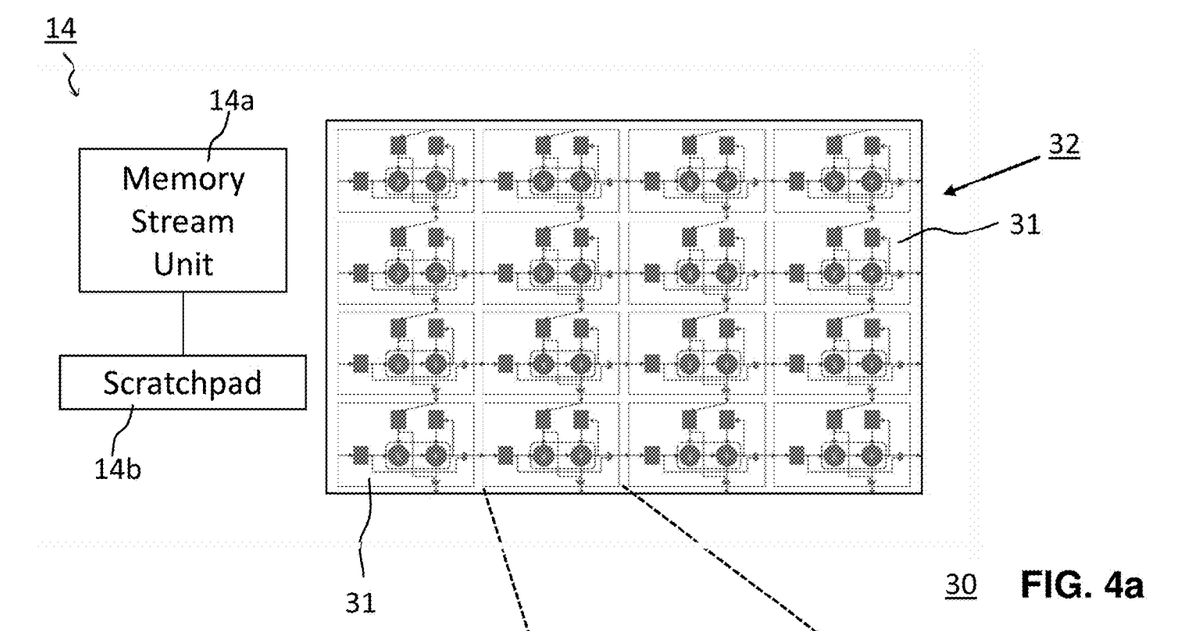
FIG. 4a shows a detailed embodiment of a co-processing unit forming a 2-dimensional systolic array of bit-serial processing units.

FIG. 4a shows a more detailed embodiment of the co-processing unit 30 and the data supply unit 14. The data supply unit 14 encompasses a memory stream unit 14a and a scratchpad 14b. The co-processing unit 30 comprises a parallel array 32 of bit-serial processing units 31. The bit-serial processing units 31 are adapted to perform the linear algebraic operations with variable precision. The parallel array 32 is embodied as a 2-dimensional systolic array. Such a 2-dimensional systolic array can be used for efficient matrix-matrix or matrix-vector multiplications/operations.

Figure 4B:
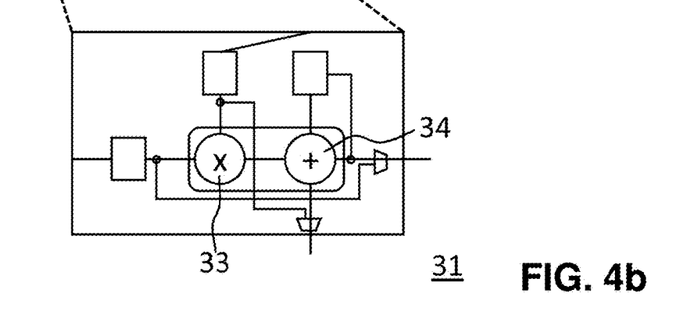
FIG. 4b shows an enlarged view of a bit-serial processing unit.

FIG. 4b shows an enlarged view of a bit-serial processing unit 31. Each of the bit-serial processing units 31 comprises a bit-serial multiplier 33 and a bit-serial adder 34. The bit-serial adder 34 is preferably embodied as a full adder with carry save. Accordingly, the bit-serial processing units 31 are embodied as bit-serial multiply-accumulate units, in particular as fused serial multiply-accumulate units and can perform a multiply-accumulate operation.

Figure 5:
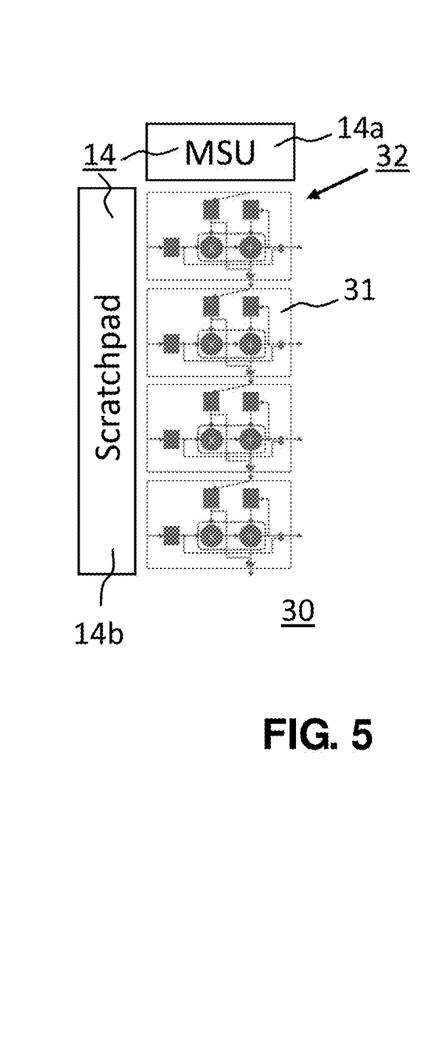
FIG. 5 shows a co-processing unit having a 1-dimensional array of bit-serial processing units.

FIG. 5 shows a more detailed embodiment of another co-processing unit 30 and the data supply unit 14. The data supply unit 14 encompasses a memory stream unit 14a and a scratchpad 14b. The co-processing unit 30 comprises a parallel array 32 of bit-serial processing units 31. The bit-serial processing units 31 are adapted to perform the linear algebraic operations with variable precision. The parallel array 32 is embodied as a 1-dimensional array. Such 1-dimensional array can be used for efficient vector multiplications.

Figure 6:
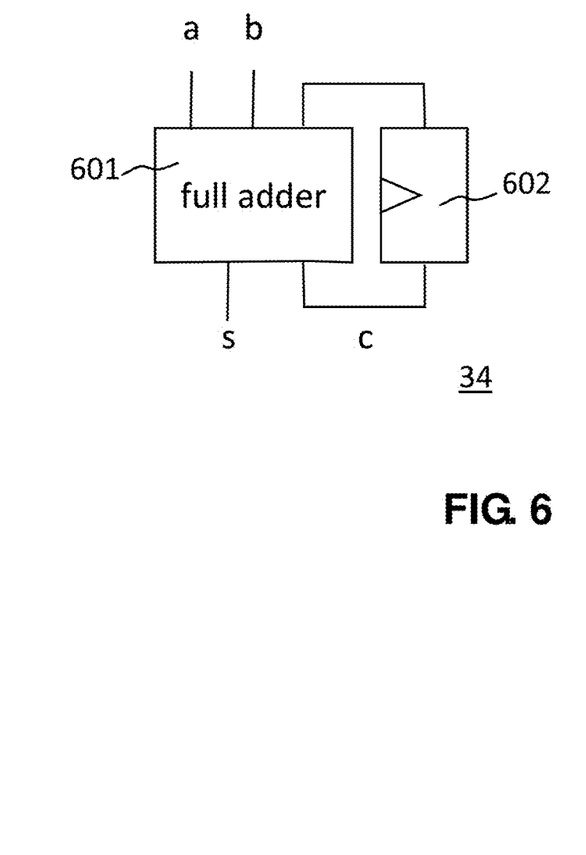
FIG. 6 shows an embodiment of a bit serial adder.

FIG. 6 shows a more detailed embodiment of a bit serial adder 34.

The bit serial adder 34 comprises a full adder 601 and a flip flop 602 which receives a carry-over signal c. The bit serial adder 34 receives and processes input signals a and b and derives a sum s as result.

Figure 7:
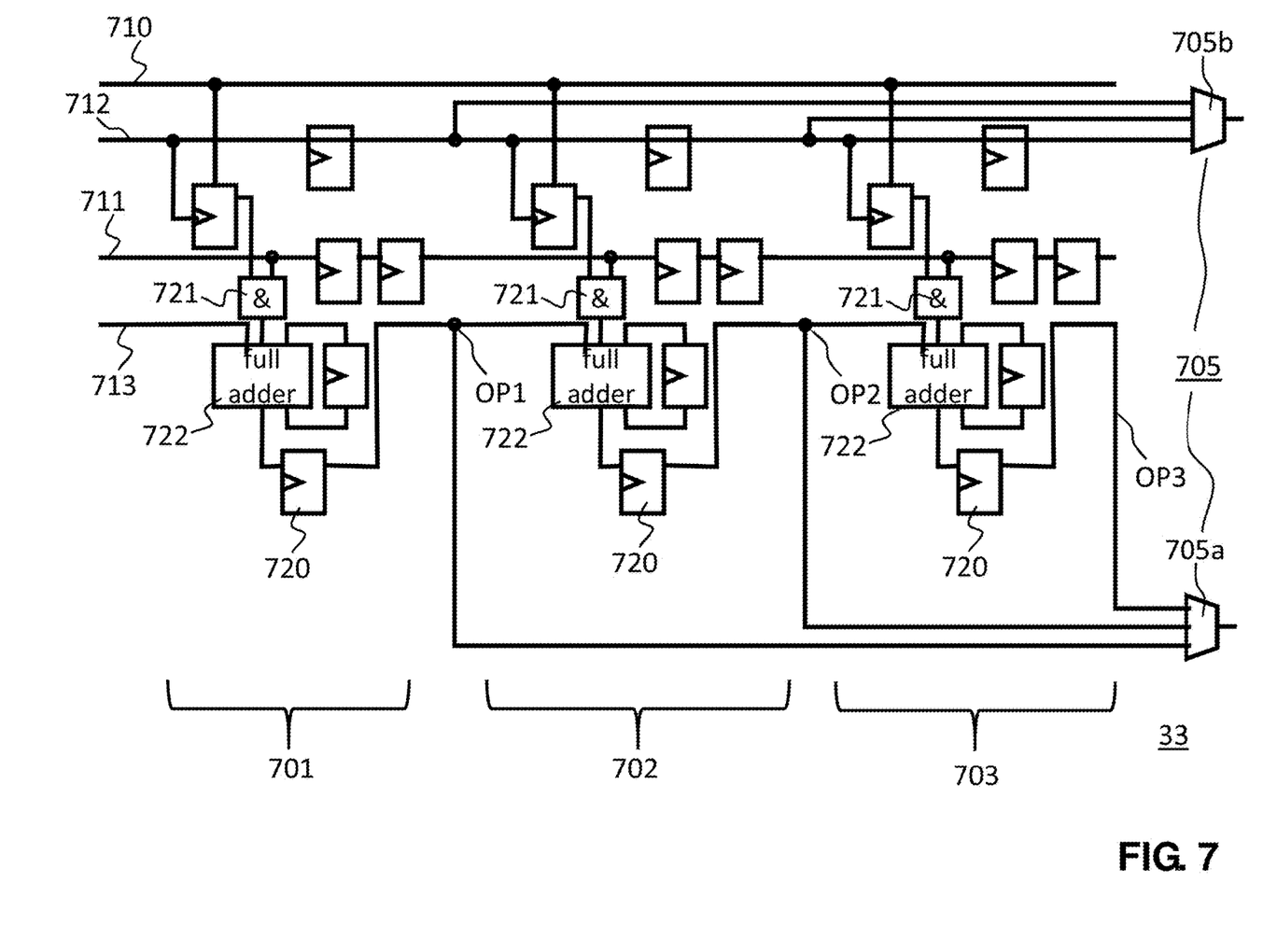
FIG. 7 shows an embodiment of a bit-serial multiplier.

FIG. 7 shows a more detailed embodiment of a bit-serial multiplier 33.

Bit-serial multipliers according to embodiments of the invention are in general designed for the maximum precision which the co-processing unit 30 is designed for. More particularly, if the maximum precision is d-bits, the bit serial multipliers 33 of the co-processing unit 30 are designed for a multiplication of d-bits.

In the example shown in FIG. 7, the bit-serial multiplier 33 is designed for a serial multiplication of a maximum of 3 bits. Accordingly it comprises a first stage 701, a second stage 702 and a third stage 703.

The bit-serial multiplier 33 comprises a first input line 710 and a second input line 711 for the input operands of the multiplication to be performed. In addition, the multiplier 33 comprises a control line 712 for a control bit or control flag and a carry-over line for a carry bit. The control bit or control flag is used to indicate the first bit of a new data word.

An elastic interface may be used for local synchronization between connected serial processing units in the pipeline.

The bit-serial multiplier 33 comprises a plurality of flip flops 720, AND gates 721 and full adders 722.

To facilitate the performance of linear algebraic operations with a lower precision than the maximum precision, the bit serial multipliers 33 of embodiments of the invention comprises a bypass logic 705 which is configured to support input data of variable precision. The bypass logic 705 comprises a multiplexer 705a and a multiplexer 705b. The multiplexer 705a allows to read out lower precision results. More particularly, the multiplexer 705a allows to read out multiplication results of 1-bit precision of an output port OP1 of the first stage 701, multiplication results of 2-bit precision of an output port OP2 of the second stage 702 and multiplication results of 3-bit precision (maximum precision) of an output port OP3 of the third stage 703. The multiplexer 705b allows to read out intermediate results of the control bit on the control line 712.

The bit-serial multiplier 33 may use power gating or clock gating to deactivate unused stages. As an example, for a 2-bit precision in the embodiment of FIG. 7, the third stage 703 may be deactivated. This may save power.

Apart from the bypass logic 705, the bit serial multiplier 33 corresponds essentially to the design of the bit serial multiplier as disclosed by Sips in "Comments on 'An 0(n) Parallel Multiplier with Bit-Sequential Input and Output'", IEEE Transactions on Computers C-31:4, 1982.

Figure 8:
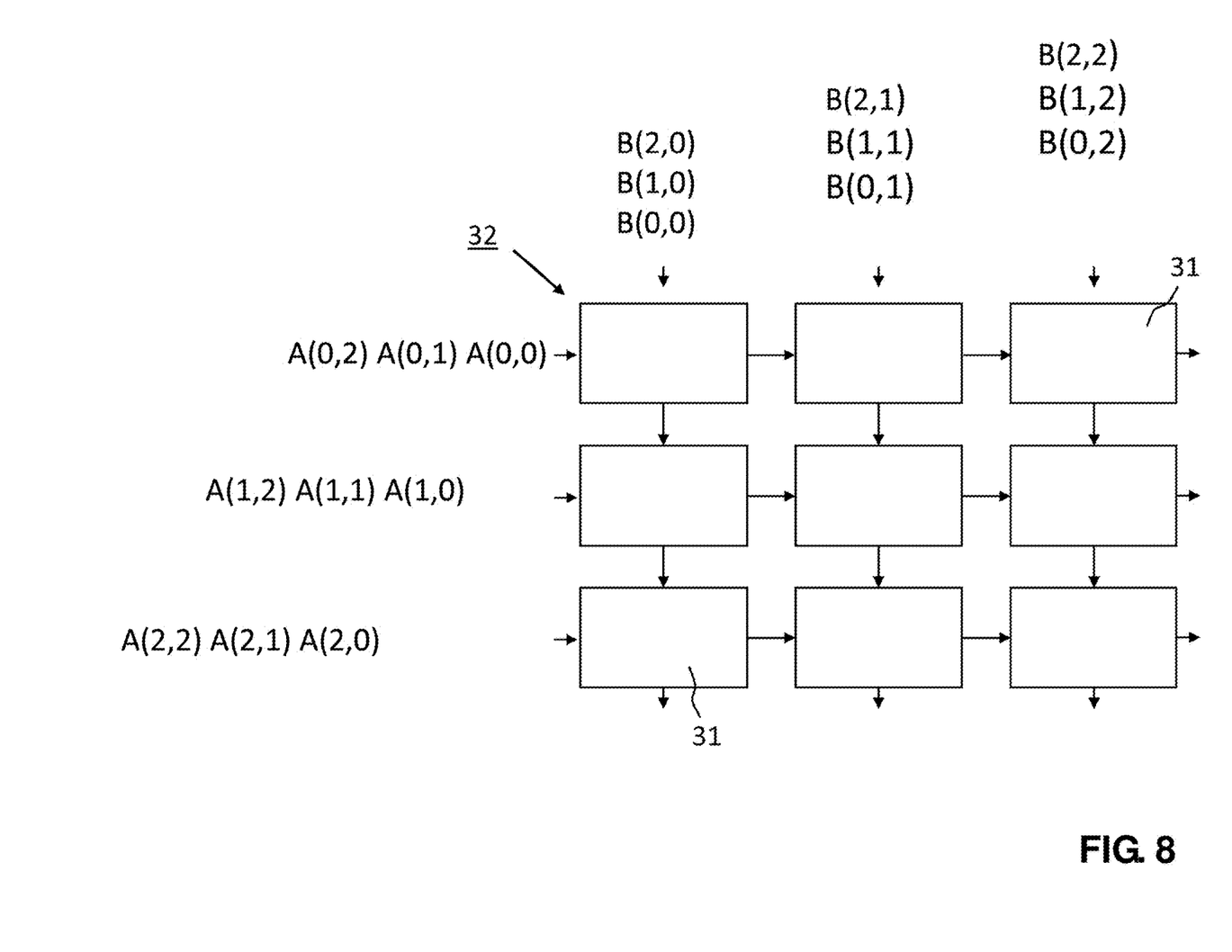
FIG. 8 illustrates an exemplary example of a parallel array of bit-serial processing units forming a systolic array for a multiplication of two 3-dimensional matrices.

FIG. 8 illustrates an exemplary example of a parallel array of bit-serial processing units 31 forming a systolic array 32 for a multiplication of a 3-dimensional matrix-matrix A with a 3-dimensional matrix B. The respective bits of the rows of the matrix A and of the columns of the matrix B are supplied to the corresponding rows and columns of the parallel systolic array 32 in a staggered way.

Figure 9:
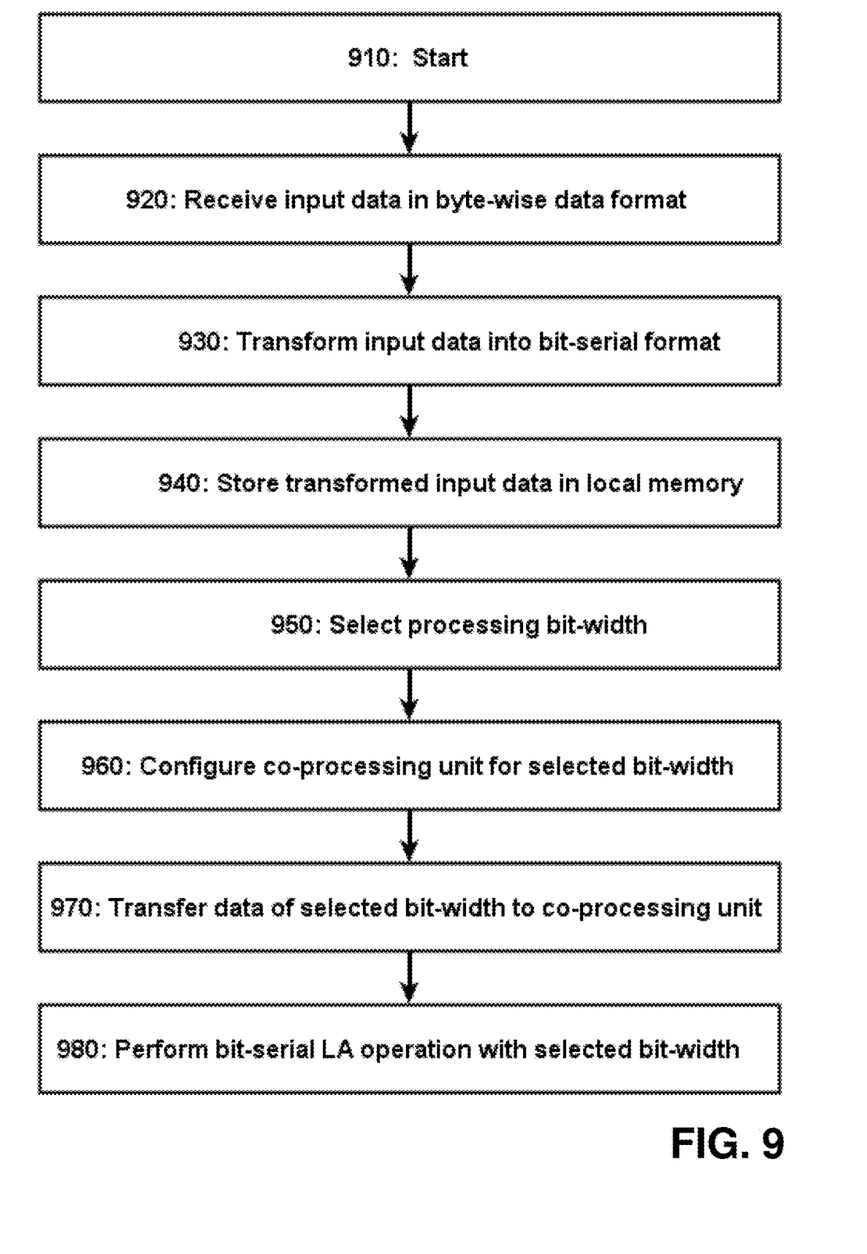
FIG. 9 shows method steps of a computer implemented method for performing linear algebraic operations or computations.

FIG. 9 shows method steps of a computer implemented method for performing linear algebraic operations or computations by a computing system, e.g. by the computing system 100 of FIG. 1.

At a step 910, the method starts.

At a step 920, the data reorganization unit 13 receives input data in a byte-wise format from the host unit 20.

At a step 930, the data reorganization unit 13 transforms the input data into a bit-serial format.

At a step 940, the data reorganization unit 13 stores the transformed input data in the local memory 12.

At a step 950, the application 40 selects a processing bit-width.

At a step 960, the data supply unit 14 configures the co-processing unit 30 for the selected bit width. This may include to deactivate stages of the bit-serial multipliers that are not needed for the respective bit-width.

At a step 970, the data supply unit 14 transfers data of the selected bit-width to the co-processing unit 30.

At a step 980, the co-processing unit 30 performs bit-serial linear algebraic operations with the selected bit-width on the supplied data.

Aspects of the invention may be embodied as a computer program product for operating the computing system 100. The computer program product comprises a computer readable storage medium having program instructions embodied therewith. The program instructions may be executable by the host unit 20 and/or the co-processing module 10 to cause the host unit 20 and/or the co-processing module 10 to perform methods according to embodiments of the invention as described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system configured to perform linear algebraic operations, the computing system comprising:
    a co-processing module comprising a co-processing unit,
        the co-processing unit comprising a parallel array of bit-serial processing units, the bit-serial processing units being adapted to perform the linear algebraic operations with variable precision, wherein the co-processing module comprises a local memory, the local memory comprising a bit-level memory layout; and a host unit comprising
- a main memory;
- a central processing unit; and
- an offload engine adapted to configure the co-processing module for a subsequent data transfer between the main memory and the local memory;

wherein:

each of the bit-serial processing units comprises:
- a bit-serial multiplier; and
- a bit-serial adder; and each of the bit-serial multipliers comprises:
- first and second input lines, a control line, and a carry over line;
- a plurality of stages, each of said stages in turn comprising:
  - an AND gate having first and second inputs coupled to the first and second input lines and an output;
  - a full adder including a first input coupled to said output of said AND gate, a second input, and an output; and
  - a flip-flop having an input coupled to said output of said full adder and having a stage output port;
  - wherein, for a first one of said plurality of stages, said second input of said full adder is coupled to said carry over line and for each of said plurality of stages other than said first one of said plurality of stages, said second input is coupled to said stage output port for a previous one of said stages; and
- a bypass logic configured to support input data of variable precision, said bypass logic comprising:
  - a first multiplexer configured to read out multiplication results of one-bit precision from said stage output port of said first one of said plurality of stages, results of maximum precision from said stage output port of a last one of said plurality of stages, and results of corresponding intermediate precision from one or more of said stage output ports of one or more intermediate ones of said plurality of stages; and
  - a second multiplexer configured to read out intermediate results of a control bit from said control line.

2. The computing system according to claim 1, wherein the bit-serial multipliers are configurable by software to perform the linear algebraic operations in variable precisions from 1-bit to k-bit, wherein k is the maximum precision of the bit-serial multiplier, the software comprising an application program carrying out linear algebraic computations.

3. The computing system according to claim 1, wherein the bypass logic is configured to use power gating or clock gating to deactivate unused stages of the bit-serial multiplier.

4. The computing system according to claim 1, wherein the parallel array of bit-serial processing units is a 2-dimensional systolic array having a plurality of rows and columns and configured to receive staggered bits of rows of a first matrix and staggered bits of columns of a second matrix.

5. The computing system according to claim 1, wherein the linear algebraic operations are those of a deep neural network application.

* * * * *